United States Patent
Zhou et al.

(10) Patent No.: US 11,719,629 B2
(45) Date of Patent: Aug. 8, 2023

(54) NON-LINEAR OPTICAL PUMPING DETECTION APPARATUS AND NON-LINEAR OPTICAL ABSORPTION CROSS-SECTION MEASUREMENT METHOD

(71) Applicant: JIANGSU UNIVERSITY, Zhenjiang (CN)

(72) Inventors: Zhiqiang Zhou, Zhenjiang (CN); Jiawei Cong, Zhenjiang (CN); Yanqun Tong, Zhenjiang (CN); Mingyang Chen, Zhenjiang (CN); Liu Lv, Zhenjiang (CN); Yonghong Fu, Zhenjiang (CN); Naifei Ren, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/781,003

(22) PCT Filed: Jan. 27, 2021

(86) PCT No.: PCT/CN2021/073912
§ 371 (c)(1),
(2) Date: May 30, 2022

(87) PCT Pub. No.: WO2021/169713
PCT Pub. Date: Sep. 2, 2021

(65) Prior Publication Data
US 2022/0412882 A1 Dec. 29, 2022

(30) Foreign Application Priority Data

Feb. 28, 2020 (CN) .......................... 202010127302.0
Feb. 28, 2020 (CN) .......................... 202010127319.6
Feb. 28, 2020 (CN) .......................... 202010127320.9

(51) Int. Cl.
*G01N 21/359* (2014.01)
*G02B 5/00* (2006.01)
(Continued)

(52) U.S. Cl.
CPC .......... *G01N 21/359* (2013.01); *G02B 5/005* (2013.01); *G02B 17/023* (2013.01);
(Continued)

(58) Field of Classification Search
CPC ....... G01N 21/359; G01N 2201/06113; G01N 2201/0636; G01N 21/25; G02B 5/005;
(Continued)

(56) References Cited

U.S. PATENT DOCUMENTS

2003/0127609 A1* 7/2003 El-Hage ............. G01N 21/6452
250/574
2014/0051191 A1 2/2014 Van Stryland et al.
(Continued)

FOREIGN PATENT DOCUMENTS

CN           1945342 A      4/2007
CN         101109703 A      1/2008
(Continued)

OTHER PUBLICATIONS

Huantian Xu, Nondegenerate Two-photon Absorption Properties of Fluorescent Dyes, A thesis submitted to Zhengzhou University for the degree of Master, 2018, pp. 1-65.
(Continued)

*Primary Examiner* — Kiho Kim
(74) *Attorney, Agent, or Firm* — Bayramoglu Law Offices LLC

(57) ABSTRACT

A non-linear optical pumping detection apparatus and a non-linear optical absorption cross-section measurement method, which can simultaneously measure degenerate and non-degenerate two-photon absorption cross-section spec-
(Continued)

tra. The measurement process is automatic, efficient and fast. The working wavelength band is from 380 nm to near infrared 1064 nm, and the non-linear performance measurement of the super-continuous wide spectra can be realized. A zoom optical system with a larger entrance pupil diameter is adopted as a weak signal acquisition lens. So the weak signal can be effectively extracted from background noise. Meanwhile, the mean square root diameter of an on-axis image point of the zoom optical system is 100 to 150 microns, the divergence angle $2\alpha$ of the on-axis image point is 30.6 degrees, which well match the optical fiber coupling condition, thereby improving the coupling efficiency of the space light coupling into the optical fiber, and greatly improving the measurement sensitivity.

20 Claims, 10 Drawing Sheets

(51) Int. Cl.
| | | |
|---|---|---|
| *G02B 17/02* | (2006.01) | |
| *G02B 17/06* | (2006.01) | |
| *G02B 19/00* | (2006.01) | |
| *G02B 27/14* | (2006.01) | |
| *G02B 5/20* | (2006.01) | |

(52) U.S. Cl.
CPC ..... *G02B 17/0668* (2013.01); *G02B 19/0014* (2013.01); *G02B 27/144* (2013.01); *G02B 27/145* (2013.01); *G01N 2201/0636* (2013.01); *G01N 2201/06113* (2013.01); *G02B 5/205* (2013.01)

(58) Field of Classification Search
CPC .............. G02B 17/023; G02B 17/0668; G02B 19/0014; G02B 27/144; G02B 27/145; G02B 5/205; G02B 27/146; G02F 1/35
See application file for complete search history.

(56) References Cited

U.S. PATENT DOCUMENTS

| | | | | |
|---|---|---|---|---|
| 2014/0126048 | A1* | 5/2014 | Nishiwaki | G02B 21/06 359/386 |
| 2014/0312212 | A1* | 10/2014 | Schappacher | G01J 3/0224 250/225 |
| 2018/0252648 | A1* | 9/2018 | Dohi | G02B 21/008 |

FOREIGN PATENT DOCUMENTS

| | | |
|---|---|---|
| CN | 107449738 A | 12/2017 |
| CN | 109406454 A | 3/2019 |
| CN | 111220572 A | 6/2020 |
| CN | 111220573 A | 6/2020 |

OTHER PUBLICATIONS

Min Shui, et al., Measurements of dynamics of nondegenerate optical nonlinearity in ZnS with pulses from optical parameter generation, Optics Communications, 2012, pp. 1940-1944, vol. 285.
Shoichi Yamaguchi, et al., Observation of an optically forbidden state of C60 by nondegenerate two-photon absorption spectroscopy, Chemical Physics Letters, 2004, pp. 136-139, vol. 390.
Mansoor Sheik-Bahae, et al., Sensitive Measurement of Optical Nonlinearities Using a Single Beam, IEEE Journal of Quantum Electronics, 1990, pp. 760-769, vol. 26, No. 4.

* cited by examiner

NON-LINEAR OPTICAL PUMPING DETECTION APPARATUS AND NON-LINEAR OPTICAL ABSORPTION CROSS-SECTION MEASUREMENT METHOD

CROSS REFERENCE TO THE RELATED APPLICATIONS

This application is the national phase entry of International Application No. PCT/CN2021/073912, filed on Jan. 27, 2021, which is based upon and claims priority to Chinese Patent Applications No. 202010127319.6, No. 202010127302.0, and No. 202010127320.9, all filed on Feb. 28, 2020, the entire contents of which are incorporated herein by reference.

TECHNICAL FIELD

The present invention relates to a non-linear optical pumping detection apparatus and a non-linear optical absorption cross-section measurement method, and belongs to the field of non-linear optics and optical detection.

BACKGROUND

With the rapid development of optical communication and optical information processing, the research of non-linear optical materials becomes more and more important. Non-linear optical materials have been widely used in optical switches, all-optical devices, high-speed optoelectronic devices, high-power laser devices, laser protection and optical power limiting. The study of optical nonlinearities of materials is a hot topic in materials science and related fields. Optical nonlinearities measurement technology is one of the key technologies to study non-linear optical materials. For materials' application, it is very important to understand the optical nonlinearities mechanism of materials and how to accurately determine the important physical parameters of materials. At present, optical nonlinearity measurement techniques include degenerate four-wave mixing, three-wave mixing, third harmonic method, non-linear interferometry, non-linear ellipsometry, Mach-Zehnder interferometry, 4F phase coherent imaging method, Z-scan method and so on. The Z-scan method (see SHEIK-BAHAE, M.; SAID, A. A.; WEI, T. H.; HAGAN, D. J.; STRYLAND, E. W. V., Sensitive measurement of optical nonlinearities using a single beam. IEEE J. Quantum Electron. 1990, 26 (4), 760-769.) is the most commonly used method to measure the optical nonlinearities of materials at present. It has the advantages of measuring non-linear refraction and non-linear absorption at the same time, simple equipment and high sensitivity. However, the traditional Z-scan method usually uses a single-wavelength laser, which can only obtain the optical non-linear characteristics of photonic materials at a specific wavelength, and provide very limited information. To study the optical nonlinearities of photonic materials, it is necessary to understand the optical nonlinearities of materials in a wide wavelength range. However, the traditional measurement devices of non-linear spectral characteristics can't meet the requirement.

Non-linear optical effect occurs under the action of the high intensity optical electric field $E(r,t)$ of laser. Not only linear electric polarization intensity $P^{(1)}(r,t)$ will be generated in the medium under the action of the incident field $E(r,t)$ with linear relationship. It also produces a non-linear electric polarization intensity $P^{NL}(r,t)$ that has a power law dependence on the electric field of the incident light, which may include terms of second, third, and higher powers of the optical electric field strength. This brings very rich contents to non-linear optics. The most important physical quantity describing the relationship between the electric polarization intensity $P(r,t)$ of the medium and the photoelectric field intensity $E(r,t)$ is the optical polarizability. Corresponding to the electric polarization intensity of different powers, the optical polarizability of the medium include linear optical polarizability $\chi^{(1)}$, non-linear optical polarizability $\chi^{(2)}$, $\chi^{(3)}$ etc. They are second-order, third-order and fourth-order complex tensors respectively, reflecting the different responses of the medium to the photoelectric field. It also directly determines the various non-linear optical effects. Its real part determines the linear (non-linear) refractive index, while its imaginary part determines the linear (non-linear) absorption of the medium. The non-linear absorption of the medium is directly related to the energy level distribution inside the medium. Taking the third-order non-linear effect as an example, usually, only one photon is absorbed by the molecule to complete the transition from the ground state to the excited state, which is called single-photon absorption. Two-photon absorption refers to the process in which a molecule absorbs two-photons at the same time and transitions from the ground state to the excited state. In the process of two-photon absorption (TPA), molecules absorb two-photons with the same wavelength, which is called Degenerate two-photon absorption (D-TPA). On the contrary, a molecule absorbs two-photons with different wavelengths at the same time to complete the transition from the ground state to the excited state, which is called non-degenerate two-photon absorption. Relative to degenerate two-photon absorption, the non-degenerate two-photon absorption has a smaller absorption region, a larger absorption coefficient and a wider spectral range, and can be used in various applications such as infrared detection, quantum counting, optical sampling, two-color two-photon fluorescence microscopy imaging etc. At present, most of the measurement methods can only measure one of them (the degenerate two-photon absorption or non-degenerate two-photon absorption), They can only be measured point by point at a single wavelength, resulting in low efficiency. This brings great difficulties to the related research and application.

SUMMARY

Aiming at the defects of the prior art, the invention provides a non-linear optical pumping detection apparatus. The apparatus can simultaneously measure degenerate and non-degenerate two-photon absorption cross-section spectra. The measurement process is automatic, efficient and fast. According to the invention, the working wavelength band is from 380 nm to near infrared 1064 nm, and the non-linear performance measurement of the super-continuous wide spectra can be realized. A zoom optical system with a larger entrance pupil diameter is adopted as a weak signal acquisition lens. So the weak signal can be effectively extracted from background noise. Meanwhile, the mean square root diameter of an on-axis image point of the zoom optical system is 100 to 150 microns, the divergence angle $2\alpha$ of the on-axis image point is 30.6 degrees, which well match the optical fiber coupling condition, thereby improving the coupling efficiency of the space light coupling into the optical fiber, and greatly improving the measurement sensitivity.

The technical solution of the invention is as follows:

A non-linear optical pumping detection apparatus comprises a main light path, a non-degenerate detection system, a non-degenerate excitation system, a degenerate detection system and a reference system.

The main light path sequentially comprises a laser, a first pinhole diaphragm, a chopper, a first polarizer, a second polarizer, a first reflector and a first laser beam splitter;

The non-degenerate detection system sequentially comprises a second reflector, a first adjustable attenuator, a first converging lens, a heavy water tank, a second pinhole diaphragm, a neutral filter, a second converging lens, a second laser beam splitter, a third converging lens, a sample to be measured and a first optical signal collection system, wherein the first optical signal collection system is connected to an optical multichannel analyzer through an optical fiber, the optical multichannel analyzer is connected to a computer;

The non-degenerate excitation system sequentially comprise a second adjustable attenuator, a third reflector, a fourth reflector, a fifth reflector, a sixth reflector, a seventh reflector, an eighth reflector, a ninth reflector, a fourth converging lens, the sample and an optical power meter; The laser passing through the third converging lens and the laser passing through the fourth converging lens are superposed at a small angle (5 to 15 degrees) in the sample;

The degenerate detection system sequentially comprises a third laser beam splitter, a triple prism, a fifth converging lens, the sample and a second optical signal collection system, wherein the second optical signal collection system is connected to the optical multichannel analyzer through an optical fiber, and the optical multichannel analyzer is connected to the computer;

The reference system sequentially comprises a tenth reflector, the sample and a third optical signal collection system, wherein the third optical signal collection system is connected to the optical multichannel analyzer through an optical fiber, and the optical multichannel analyzer is connected to the computer;

The third reflector, the fourth reflector, the seventh reflector and the eighth reflector are arranged on a high-performance linear translation platform.

The first adjustable attenuator, the second adjustable attenuator, the first converging lens, the second converging lens, the third converging lens, the fourth converging lens, the fifth converging lens, the optical power meter, the first optical signal collection system, the second optical signal collection system, the third optical signal collection system and the high-performance linear translation platform are separately connected with the computer through the control line.

The diameter of the first pinhole diaphragm is 5 mm, and the diameter of the second pinhole diaphragm is 10 mm; The frequency of the chopper can be adjusted from 4 HZ to 10 KHZ; The polarization direction of the second polarizer is horizontal; The first reflectors, the second reflectors, the third reflectors, the fourth reflectors, the fifth reflectors, the sixth reflectors, the seventh reflectors and the eighth reflectors are all 45° to the main optical axis; The first laser beam splitter, the second laser beam splitter and the third laser beam splitter are all 45° to the main optical axis; The transmissivity of the first laser beam splitter is 10%, and the reflectivity is 90%; The transmissivity of the second laser beam splitter is 50%, and the reflectivity is 50%; The transmissivity of the third laser beam splitter is 10%, and the reflectivity is 90%; The focal lengths of the first converging lens, the second converging lens, the third converging lens and the fifth converging lens are all 10 cm, and the focal length of the fourth converging lens is 50 cm. The thickness of the sample is 10 mm.

The first optical signal collection system, the second optical signal collection system, and the third optical signal collection system adopt completely the same zoom optical system. The zoom optical system comprises a first lens, a second lens, a third lens, a fourth lens, the fifth lens, the sixth lens, seventh lens, eighth lens, ninth lens, tenth lens, eleventh lens, twelfth lens and thirteenth lens in sequence;

The first lens is the aperture stop;

The first lens is a positive lens, the second lens is a negative lens, the third lens is a positive lens, the fourth lens is a positive lens, the fifth lens is a negative lens, the sixth lens is a positive lens, the seventh lens is a negative lens, the eighth lens is a negative lens, the ninth lens is a positive lens, the tenth lens is a positive lens, the eleventh lens is a negative lens, the twelfth lens is a positive lens and the thirteenth lens is a positive lens;

The first lens is a meniscus concave lens, the second lens is a meniscus concave lens, the third lens is a biconvex lens, the fourth lens is a biconvex lens, the fifth lens is a biconvex lens, the sixth lens is a biconvex lens, the seventh lens is a biconvex lens, the eighth lens is a meniscus concave lens, the ninth lens is a biconvex lens, the tenth lens is a meniscus concave lens, the eleventh lens is a meniscus concave lens, the twelfth lens is a biconvex lens, The thirteenth lens is a meniscus concave lens;

The second lens and the third lens form a cemented lens, and the cemented surface of the double cemented lens faces to the aperture stop; The fourth lens and the fifth lens form a cemented lens, and the cemented surface of the double cemented lens backs to the aperture stop; The eighth lens and the ninth lens form a cemented lens, and the cemented surface of the double cemented lens faces to the aperture stop; The tenth lens and the eleventh lens form a cemented lens, and the cemented surface of the double cemented lens backs to the aperture stop;

The eleventh lens, the twelfth lens and the thirteenth lens are all aspheric lenses; The first lens, the second lens, the third lens, the fourth lens, the fifth lens, the sixth lens, the seventh lens, the eighth lens, the ninth lens and the tenth lens are all spherical lenses;

The combined focal length of the first lens, the second lens, the third lens, the fourth lens, the fifth len and the sixth lens is f1-6, and the focal length of the seventh lens is f7; And $1.5<|f16/f7|<3$;

The aperture of the first lens is D1, and 45 mm<D1<55 mm;

The lens material is glass material from SCHOTT, the first lens is SF6, the second lens is SF5, the third lens is NLAF34, the fourth lens is NLASF9, the fifth lens is NSF56, the sixth lens is NLAK34, the seventh lens is SF57, the eighth lens is SF2, the ninth lens is NLAF21, The tenth lens is NLAF21, the eleventh lens is SF2, the twelfth lens is PPK53, and the thirteenth lens is SF5G10;

The air interval between the sample and the first lens is a variable ranging from 50 to 200 millimeters;

The center thickness of the first lens is 4.678±0.1 mm, and the air interval between the first lens and the cemented lens consisting of the second lens and the third lens is 1.0±0.1 mm; And the center thickness of the cemented lens consisting of the second lens and the third lens is 19.891±0.1 mm, the air interval between the cemented lens consisting of the second lens and the third lens and the cement lens consisting of the fourth lens and the fifth lens is 9.986±0.1 mm; The center thickness of the cemented lens composed of the fourth lens and the fifth lens is 21.593±0.1 mm, and the air interval between the cemented lens composed of the fourth lens and the fifth lens and the sixth lens is 1.438±0.1 mm; The center thickness of the sixth lens is 10.128±0.1 mm, and the air interval between the sixth lens and the seventh lens is a variable ranging from 4.563±0.1 to 69.469±0.1 mm; The center thickness of the seventh lens is 2.0±0.1 mm, and the air interval between the seventh lens and the cemented lens consisting of the eighth lens and the ninth lens is 1.0±0.1 mm; The center thickness of the cemented lens consisting of the eighth lens and the ninth lens is 6.629±0.1 mm, and the air interval between the cemented lens consisting of the eighth lens and the ninth lens and the cemented lens consisting of the tenth lens and the eleventh lens is variable within a range from 1.0±0.1 to 33.162±0.1 mm; And the center thickness of the cemented lens consisting of the tenth lens and the eleventh lens is 17.276±0.1 mm, The air interval between the cemented lens consisting of the tenth lens and the eleventh lens and the twelfth lens is variable and ranges from 0.930±0.1 to 25.0±0.1 millimeters; The center thickness of the twelfth lens is 6.614±0.1 mm, and the air interval between the twelfth lens and the thirteenth lens is variable from 1.438±0.1 to 9.055±0.1 mm; The center thickness of the thirteenth lens is 5.356±0.1 mm, and the air interval between the thirteenth lens and the optical fiber is 18.0±0.1 mm;

The working wavelength band of the zoom optical system is 380 nm to near infrared 1064 nm;

The back working distance of the zoom optical system is 18.0 mm, and the axial image point divergence angle $2\alpha$ is 30.6 degrees;

The non-linear optical absorption cross-section measurement method by using the non-linear optical pumping detection apparatus comprises the following steps:

1. System Initialization:

The initial values of the non-linear optical pumping detection apparatus are set according to the actual measurement requirements and the laser parameters, and the details are as follows:

① According to the actual measurement requirements, select an appropriate laser, and adjust the chopper according to the laser's own parameters (such as output power, pulse frequency, etc.) to control the laser repetition frequency which incidence to the sample. Adjust the polarization direction of the second polarizer to be vertical, adjust the first polarizer to adjust the incident energy of the whole light path, and ensure that the sample, optical power meter and optical multichannel analyzer will not be damaged when the transmissivity of the first adjustable attenuator and the second adjustable attenuator is 100%. Adjust the ninth reflector and the fourth converging lens to make the laser converge on the rear surface of the sample, and adjust the second adjustable attenuator to make the laser energy slightly lower than the energy threshold of two-photon absorption in the sample. Adjust the first converging lens to make the laser converge on the central position of the heavy water tank, and adjust the first adjustable attenuator to make the heavy water tank generate stable white light. Adjust the second converging lens to enable the white light to be emitted in parallel. And adjust the third converging lens to make the white light converge on the sample and generate effective coincidence with the converging beam from the fourth converging lens. Adjust the high-performance linear translation platform to synchronize the non-degenerate excitation light path and the non-degenerate detection light path. Adjust the fifth converging lens to make the laser converge on the sample, and make sure the converging point is not coincident with the non-degenerate light path. Adjust the tenth reflector to enable the reference light path to pass through the sample and not to coincide with the degenerate light path and the non-degenerate light path. Respectively adjust the first optical signal collection system, the second optical signal collection system and the third optical signal collection system to make the signal received by the optical multichannel analyzer strongest.

2. Non-Linear Absorption Spectra Measurement

The non-linear absorption spectra are divided into non-degenerate absorption spectra and degenerate absorption spectra, and the measurement process is carried out simultaneously, as follows:

② Non-Linear Absorption Spectra Measurement

After the apparatus is started and the output of the laser is stable, the laser passing through the third converging lens and the laser passing through the fourth converging lens are superposed in the sample at a small angle (5 to 15 degrees). Upon initialization of the apparatus, the first adjustable attenuator, the second adjustable attenuator, the first converging lens, the second converging lens, the third converging lens, the fourth converging lens, the fifth converging lens, the first optical signal collection system, the second optical signal collection system, the third optical signal collection system and the high-performance linear translation platform are all optimized by the computer in a circulation way one by one. Until the signals received by the optical multichannel analyzer from the first optical signal collection system, the second optical signal collection system and the third optical signal collection system are all the strongest. At this moment, the sampling integral time and the sampling times are set by the computer. The optical signals of the first optical signal collection system, the second optical signal collection system and the third optical signal collection system are simultaneously collected and stored by the optical multichannel analyzer. A non-degenerate transmission spectrum P1, a degenerate transmission spectrum P2 and a reference spectrum P3 of the sample are obtained respectively. Then the sample is taken out of the apparatus, and a reference sample which is prepared in advance and does not contain a sample is put in. The optical signals of the first optical signal collection system, the second optical signal collection system and the third optical signal collection system are simultaneously collected and stored by the optical multichannel analyzer. And a non-degenerate transmission spectrum P4, a degenerate transmission spectrum P5 and a reference spectrum P6 of the reference sample are obtained respectively.

3. Monitoring Part

The influencing factors that may be encountered during the measurement shall be monitored, and the abnormalities shall be handled in time, as follows:

③ In the measurement process, the computer repeatedly collects and stores the optical signals of the third optical signal collection system through the optical multichannel analyzer in real time. The working state of the apparatus is obtained by analyzing the data in real time. If there is a big difference between the two data obtained in the measurement process, the computer will be automatically abandoned the measured data by this process ②. The computer performs monitoring through the optical power meter in real time. And if the power changing in the measurement process, it means the laser is unstable, and the computer will be automatically abandoned the measured data by this process ②.

4. Data Processing

According to the experimental data, the non-degenerate absorption spectrum and degenerate absorption spectrum of the sample are obtained. The details are as follows:

④ Normalize the non-degenerate transmission spectrum P1 and the degenerate transmission spectrum P2 point by point with reference to the reference spectrum P3 respectively to obtain a normalized non-degenerate transmission spectrum P1' and a normalized degenerate transmission spectrum P2' respectively.

Normalize the non-degenerate transmission spectrum P4 and the degenerate transmission spectrum P5 point by point with reference to the reference spectrum P6 to obtain a normalized non-degenerate transmission spectrum P4' and a normalized degenerate transmission spectrum P5' respectively.

Subtract the normalized non-degenerate transmission spectrum P4' from the normalized non-degenerate transmission spectrum P1' to obtain the relative non-degenerate absorption spectrum X1 of the sample; Subtract the normalized degenerate transmission spectrum P5' from the normalized degenerate transmission spectrum P2' to obtain the relative degenerate absorption spectrum X2 of the sample;

The absolute absorption cross-section at the wavelength $\lambda$ is calculated as follows:

The relationship between the normalized transmittance $Q'(\tau_d)$ of the probe light and the normalized delay time $\tau_d$ (the ratio of the delay time to the pulse width of the excitation light) is:

$$Q'(\tau_d, W, \rho, \gamma) = \frac{1}{W\pi^{1/2}} \int_{-\infty}^{+\infty} \exp\left\{-\left(\frac{\tau+\tau_d-\rho}{W}\right)^2 - \frac{\gamma\pi^{1/2}}{\rho}(\mathrm{erf}(\tau)-\mathrm{erf}(\tau-\rho))\right\} d\tau \quad (1)$$

Where $W = w_p/w_e$ is the ratio of the probe light pulse width to the excitation light pulse width, and $\mathrm{erf}(\tau)$ as an error function is defined as:

$$\mathrm{erf}(x) = \frac{2}{\sqrt{\pi}} \int_0^x e^{-y^2} dy = -\frac{1}{x\sqrt{\pi}} e^{-x^2} \quad (2)$$

$\rho$ is the group velocity mismatch parameter between the excitation light and the probe light, which can be obtained from the dispersion relation:

$$\rho = \frac{L}{w_e c}\left\{\left[n_p - \lambda_p \frac{d_n}{d_\lambda}|_\lambda\right] - \left[n_e - \lambda_e \frac{d_n}{d_\lambda}|_e\right]\right\} \quad (3)$$

Where $d_n$ is the refractive index change, $d_\lambda$ is the wavelength change. $\lambda$ represents the wavelength, n represents the refractive index, the subscript p represents excitation light, the subscript e represents detection light, and c represents the speed of light.

In this study, $\rho$ is used as the fitting parameter because the solution dispersion relation is unknown. The relationship between another fitting parameter $\gamma$ and the non-degenerate two-photon absorption coefficient $\beta_{ND}$ is expressed as:

$$\gamma = L(n_2/n_1)I_1^0 \beta_{ND} \quad (4)$$

Where L is the thickness of the sample, $n_1$ and $n_2$ are the linear refractive indices of the excitation light and the detection light (which are approximately considered to be equal here), and $I_1^0$ is the peak power density of the excitation light at the focal point, which is converted from the power obtained by the optical power meter.

The relation between the non-degenerate two-photon absorption cross-section $\delta_{ND}$ and the non-degenerate two-photon absorption coefficient $\beta_{ND}$ is:

$$\delta_{ND} = \frac{1000h\left(\frac{v_1+v_2}{2}\right)\beta_{ND}}{N_A C} \quad (5)$$

Where h is Planck's constant, $v_1$ and $v_2$ are the photon frequencies of the excitation and detection light, $N_A$ is Avogadro's constant, and C is the sample concentration.

The fitting parameter $\gamma$ can be obtained by fitting the experimental data (the relationship between the normalized transmittance and the delay time) through formula (1), and the non-degenerate two-photon absorption coefficient $\beta_{ND}$ can be obtained from the $\gamma$ value through formula (4), and then the non-degenerate two-photon absorption cross-section $\delta_{ND}$ can be obtained from formula (5).

Amplifying the relative non-degenerate absorption spectrum X1 and the relative degenerate absorption spectrum X2 in the whole spectrum region according to the corresponding proportion ($\delta_{ND}$ divided by the absorption coefficient at wavelength $\lambda$) to obtain corresponding absolute non-degenerate two-photon absorption cross-section spectrum X3 and absolute degenerate two-photon absorption cross-section spectrum X4. And then the computer output this result.

The above step ②, ③, ④ can be controlled by one-key in the software to realize the automation of the measurement process.

5. Non-Linear Performance Dynamics Measurement Process

The apparatus can also measure the dynamical process of the degenerate and non-degenerate two-photon absorption spectra of the sample.

⑤ In the step ①, after adjusting the high-performance linear translation platform to synchronize the non-degenerate pumping excitation light path and the non-degenerate detection light path, and this position is time 0. When the light path difference of the pumping excitation and the detection light is changed continuously (equal to the delay time difference), a series of two-photon absorption cross-sections can be obtained at different delay times. This provides sufficient data for the study of the dynamic process of materials.

The invention has the advantages that:

1. The invention can realize the simultaneous measurement of the degenerate and non-degenerate non-linear absorption cross-section spectra.

2. The measurement process can be controlled by one key in software, so that the automation of the measurement process is realized. The measurement process is efficient and fast.

3. The working wavelength band is from 380 nm to near infrared 1064 nm, and the non-linear performance measurement of the super-continuous wide spectra can be realized.

4. A zoom optical system with a larger entrance pupil diameter is adopted as a weak signal acquisition lens. So the weak signal can be effectively extracted from background noise. Meanwhile, the mean square root diameter of an on-axis image point of the zoom optical system is 100 to 150 microns, the divergence angle $2\alpha$ of the on-axis image point is 30.6 degrees, which well match the optical fiber coupling condition, thereby improving the coupling efficiency of the space light coupling into the optical fiber, and greatly improving the measurement sensitivity.

5. The invention well corrects various aberrations, particularly chromatic dispersion, thereby solving the problem of time delay of different wavelengths during wide spectra detection. The accuracy of the signal is ensured, and a solid foundation is provided for the measurement of the dynamic process and the transient process.

6. The non-linear dynamic process of the material can be studied by adjusting the light path difference (delay time difference) between the excitation light and the detection light and measuring the transmittance of the sample at different delay times.

DETAILED DESCRIPTION OF THE EMBODIMENTS

In order to make the purposes, features and advantages of the present invention more obvious and understandable, the technical solutions of the embodiment of the present invention will be clearly and completely described below in conjunction with the attached drawings of the embodiments of the invention. Obviously, the embodiment described below is only a part of embodiments, but not all embodiments. Based on the embodiment of the present invention, all other embodiments obtained without creative work should fall within the scope of the present invention.

Figure 1:
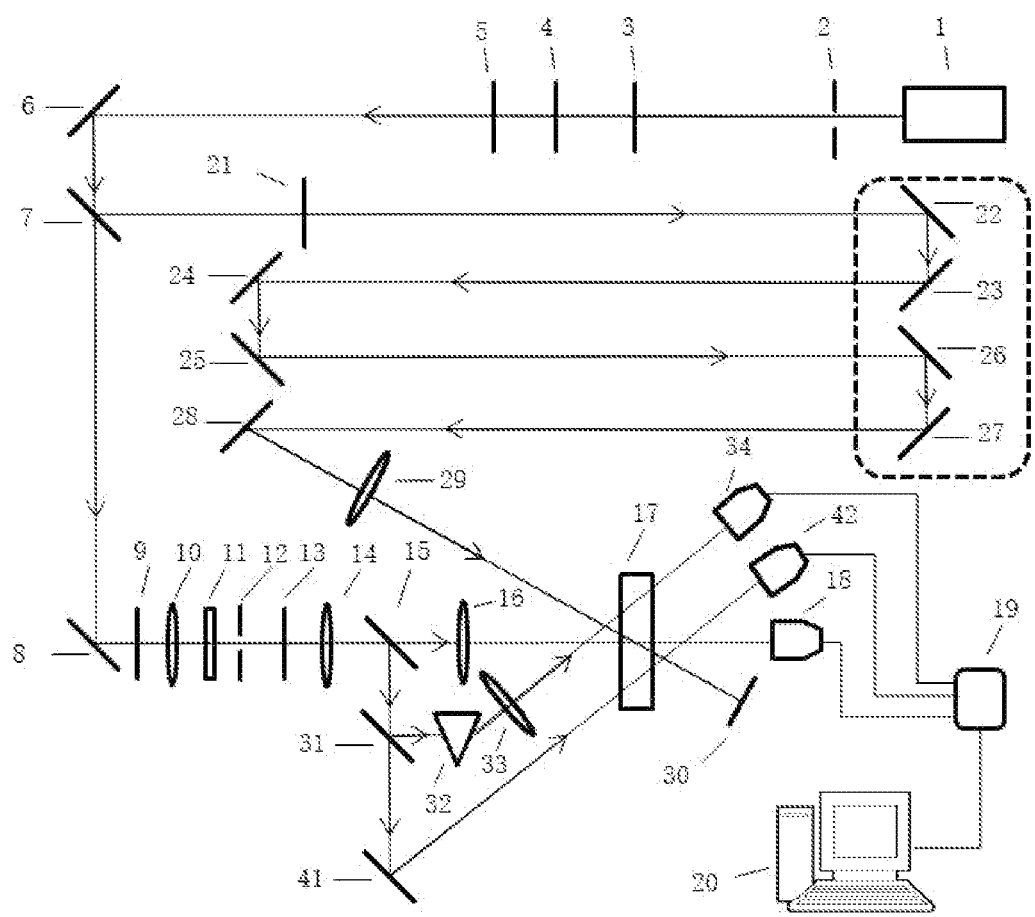
FIG. 1 is a schematic diagram of the non-linear optical pumping detection apparatus.

As shown in FIG. 1, FIG. 1 is a light path structure diagram of an embodiment of the non-linear optical pumping detection apparatus according to the present invention. The apparatus comprises a main light path, a non-degenerate detection system, a non-degenerate excitation system, a degenerate detection system and a reference system;

The main light path sequentially comprises a laser 1, a first aperture diaphragm 2, a chopper 3, a first polarizer 4, a second polarizer 5, a first reflector 6 and a first laser beam splitter 7, wherein the laser 1 outputs laser with the wavelength of 800 nm and the pulse width of 130 fs;

The non-degenerate detection system sequentially comprises a second reflector 8, a first adjustable attenuator 9, a first converging lens 10, a heavy water tank 11, a second pinhole diaphragm 12, a neutral filter 13, a second converging lens 14, a second laser beam splitter 15, a third converging lens 16, a sample 17 to be measured and a first optical signal collection system 18. The first optical signal collection system 18 is connected to an optical multichannel analyzer 19 through an optical fiber, and the optical multichannel analyzer 19 is connected to a computer 20.

The non-degenerate excitation system sequentially comprises a second adjustable attenuator 21, a third reflector 22, a fourth reflector 23, a fifth reflector 24, a sixth reflector 25, a seventh reflector 26, an eighth reflector 27, a ninth reflector 28, a fourth converging lens 29, the sample 17 and an optical power meter 30; The laser passing through the third converging lens 16 and the laser passing through the fourth converging lens 29 are superposed at a small angle of 10 degrees in the sample 17.

The degenerate detection system sequentially comprises a third laser beam splitter 31, a triple prism 32, a fifth converging lens 33, the sample 17 and a second optical signal collection system 34. The second optical signal collection system 34 is connected to the optical multichannel analyzer 19 through an optical fiber, and the optical multichannel analyzer 19 is connected to the computer 20.

The reference system sequentially comprises a tenth reflector 41, a sample 17 and a third optical signal collection system 42. The third optical signal collection system 42 is connected to the optical multichannel analyzer 19 through an optical fiber, and the optical multichannel analyzer 19 is connected to the computer 20.

The third reflectors 22, the fourth reflectors 23, the seventh reflectors 26, and the eighth reflectors 27 are arranged on a high-performance linear translation platform A.

The first adjustable attenuator 9, the second adjustable attenuator 21, the first converging lens 10, the second converging lens 14, the third converging lens 16, the fourth converging lens 29, the fifth converging lens 33, the optical power meter 30, the first optical signal collection system 18, the second optical signal collection system 34, the third optical signal collection system 42 and the high-performance linear translation platform A are separately connected with the computer 20 through the control line (in order to make the schematic diagram clear and beautiful, the control lines are not marked in the schematic diagram).

The diameter of the first pinhole diaphragm 2 is 5 mm, and the diameter of the second pinhole diaphragm 12 is 10 mm; The frequency of the chopper 3 can be adjusted from 4 Hz to 10 KHz; The polarization direction of the second polarizer 5 is horizontal; The first reflector 6, the second reflector 8, the third reflector 22, the fourth reflector 23, the fifth reflector 24, the sixth reflector 25, the seventh reflector 26, and the eighth reflector 27 are all 45° to the main optical axis. The first beam splitter 7, the second beam splitter 15, and the third beam splitter 31 are all 45° to the main optical axis. The transmissivity of the first laser beam splitter 7 is 10%, and the reflectivity is 90%; The transmissivity of the second laser beam splitter 15 is 50%, and the reflectivity is 50%; The transmissivity of the third laser beam splitter 31 is 10%, and the reflectivity is 90%; The focal lengths of the first converging lens 10, the second converging lens 14, the third converging lens 16, and the fifth converging lens 33 are all 10 cm, and the focal length of the fourth converging lens 29 is 50 cm. The thickness of the sample 17 is 10 mm.

The first optical signal collection system 18, the second optical signal collection system 34, and the third optical signal collection system 42 adopt the same zoom optical system S.

Figure 2:
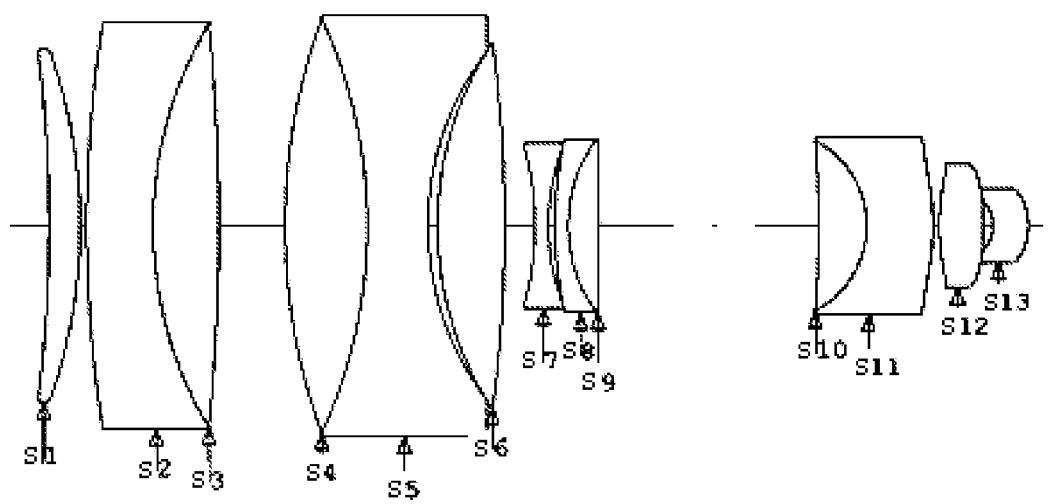
FIG. 2 is a schematic diagram of a zoom optical system S in the non-linear optical pumping detection apparatus.

As shown in FIG. 2, the zoom optical system S comprises a first lens S1, a second lens S2, a third lens S3, a fourth lens S4, a fifth lens S5, a sixth lens S6, a seventh lens S7, an eighth lens S8, a ninth lens S9, a tenth lens S10, an eleventh lens S11, a twelfth lens S12, and a thirteenth lens S13.

The first lens S1 is the aperture stop;

The first lens S1, the third lens S3, the fourth lens S4, the sixth lens S6, the ninth lens S9, and the tenth lens S10, the twelfth lens S12, the thirteenth lens S13 are all positive lenses. The second lens S2, the fifth lens S5, the seventh lens S7, the eighth lens S8, the eleventh lens S11 are all negative lenses;

The first lens S1 is a meniscus concave lens, the second lens S2 is a meniscus concave lens, the third lens S3 is a biconvex lens, the fourth lens S4 is a biconvex lens, the fifth lens S5 is a biconvex lens, the sixth lens S6 is a biconvex lens, the seventh lens S7 is a biconvex lens, the eighth lens S8 is a meniscus concave lens, the ninth lens S9 is a biconvex lens, the tenth lens S10 is a meniscus concave lens, the eleventh lens S11 is a meniscus concave lens, the twelfth lens S12 is a biconvex lens, The thirteenth lens S13 is a meniscus concave lens;

The second lens S2 and the third lens S3 form a cemented lens J1, and the cemented surface of the double cemented lens faces to the aperture stop; The fourth lens S4 and the fifth lens S5 form a cemented lens J2, and the cemented surface of the double cemented lens backs to the aperture stop; The eighth lens S8 and the ninth lens S9 form a cemented lens J3, and the cemented surface of the double cemented lens faces to the aperture stop; The tenth lens S10 and the eleventh lens S11 form a cemented lens J4, and the cemented surface of the double cemented lens backs to the aperture stop;

The eleventh lens S11, the twelfth lens S12, and the thirteenth lens S13 are aspheric lenses. The first lens S1, the second lens S2, the third lens S3, the fourth lens S4, the fifth lens S5, the sixth lens S6, the seventh lens S7, the eighth lens S8, the ninth lens S9, and the tenth lens S10 are all spherical lenses.

A combined focal length of the first lens S1, the second lens S2, the third lens S3, the fourth lens S4, the fifth lens S5 and the sixth lens S6 is f16, and a focal length of the seventh lens S7 is f7; And $1.5<|f16/f7|<3$;

The aperture of the first lens S1 is D1, and 45 mm<D1<55 mm;

The lens material is glass material from SCHOTT, the first lens S1 is SF6, the second lens S2 is SF5, the third lens S3 is NLAF34, the fourth lens S4 is NLASF9, the fifth lens S5 is NSF56, the sixth lens S6 is NLAK34, the seventh lens S7 is SF57, and the eighth lens S8 is SF2. The ninth lens S9 is NLAF21, the tenth lens S10 is NLAF21, the eleventh lens S11 is SF2, the twelfth lens S12 is PPK53, and the thirteenth lens S13 is SF5G10;

The air interval between the sample 17 and the first lens S1 is a variable ranging from 50 to 200 millimeters;

The center thickness of the first lens S1 is 4.678±0.1 mm, and the air interval between the first lens S1 and the cemented lens J1 is 1.0±0.1 mm; The center thickness of the cemented lens J1 is 19.891 f 0.1 mm, the air interval between the cemented lens J1 and the cemented lens J2 is 9.986±0.1 mm; The center thickness of the cemented lens J2 is 21.593±0.1 mm, and the air interval between the cemented lens J2 and the sixth lens S6 is 1.438±0.1 mm; The center thickness of the sixth lens S6 is 10.128±0.1 mm, and the air interval between the sixth lens S6 and the seventh lens S7 is variable, ranging from 4.563±0.1 to 69.469±0.1 mm; The center thickness of the seventh lens S7 is 2.0±0.1 mm, and the air interval between the seventh lens S7 and the cemented lens J3 is 1.0±0.1 mm; The center thickness of the cemented lens J3 is 6.629±0.1 mm, and the air interval between the cemented lens J3 and the cemented Lens J4 is variable, ranging from 1.0±0.1 to 33.162±0.1 mm; The center thickness of the cemented lens J4 is 17.276±0.1 mm, and the air interval between the cemented lens J4 and the twelfth lens S12 is a variable, ranging from 0.930±0.1 to 25.0±0.1 mm; The center thickness of the twelfth lens S12 is 6.614±0.1 mm, and the air interval between the twelfth lens S12 and the thirteenth lens S13 is variable, ranging from 1.438±0.1 to 9.055±0.1 mm; The center thickness of the thirteenth lens S13 is 5.356±0.1 mm, and the air interval between the thirteenth lens S13 and the optical fiber is 18.0±0.1 mm;

The working wavelength band of the zoom optical system S is 380 nm to near infrared 1064 nm;

The back working distance of the zoom optical system S is 18.0 mm, and the axial image point divergence angle $2\alpha$ is 30.6 degrees;

The actual lens parameters and lens center distance parameters at the zoom position 1 of the zoom optical system S are shown in Table 1 below:

TABLE 1

| Surface | Radius | Thickness | Glass |
|---|---|---|---|
| (mm): | | | |
| Object | Infinity | 50.000* | |
| S2 front surface | −204.932 | 4.678 | SF6_SCHOTT |
| S1 back surface | −77.909 | 1.000 | |
| S2 front surface | 195.597 | 10.000 | SF5_SCHOTT |
| S2 back surface/ S3 front surface | 59.350 | 9.891 | NLAF34_SCHOTT |
| S3 back surface | −308.457 | 9.986 | |
| S4 front surface | 90.672 | 12.412 | NLASF9_SCHOTT |
| S4 back surface/ S5 front surface | −74.424 | 9.181 | NSF56_SCHOTT |
| S5 back surface | 43.364 | 1.438 | |
| S6 front surface | 50.111 | 10.128 | NLAK34_SCHOTT |
| S6 back surface | −210.814 | 69.469* | |
| S7 front surface | −44.938 | 2.000 | SF57_SCHOTT |
| S7 back surface | 32.732 | 1.000 | |
| S8 front surface | 58.143 | 2.000 | SF2_SCHOTT |
| S8 back surface/ S9 front surface | 22.036 | 4.629 | NLAF21_SCHOTT |
| S9 back surface | −965.204 | 1.000* | |
| S10 front surface | −157.586 | 7.276 | NLAF21_SCHOTT |
| S10 back surface/ S11 front surface | −14.432 | 10.000 | SF2_SCHOTT |
| S11 back surface | −34.101 | 25.000* | |
| S12 front surface | 35.358 | 6.614 | PPK53_SCHOTT |
| S12 back surface | −52.992 | 9.055* | |
| S13 front surface | −5.798 | 5.356 | SF5G10_SCHOTT |
| S13 back surface | −11.059 | 18.000 | |
| The front surface of optical fiber/image surface | Infinity | 0.000 | |

Note:
The asterisk * in the table designates a variable.

The variables of zoom optical system S are shown in Table 2:

TABLE 2

| Surface | Zoom position 1 | Zoom position 2 |
|---|---|---|
| | (mm): | |
| Object | 50.000 | 200.000 |
| S6 back surface | 69.469 | 4.563 |
| S9 back surface | 1.000 | 33.162 |
| S11 back surface | 25.000 | 0.9299 |
| S12 back surface | 9.055 | 1.438 |

The aspherical data in the zoom optical system S are given in Table 3, where the aspherical formula is:

$$z(r) = \frac{cr^2}{1+[1-(1+K)c^2r^2]^{1/2}} + Ar^4 + Br^6 + Cr^8 + Dr^{10} + Er^{12} + Fr^{14} + Gr^{16} + Hr^{18} + Jr^{20} \quad (6)$$

Where,
z: Depth of aspheric surface
r: Distance from optical axis to lens surface (height) (mm)
K: Conic Constant
c: Paraxial curvature
A, B, C, D . . . : Aspheric coefficients of order 4, 6, 8, 10 . . . .

TABLE 3

| | Value | | | | |
|---|---|---|---|---|---|
| Parameter | S11 back surface | S12 front surface | S12 back surface | S13 front surface | S13 back surface |
| Y Radius (r) | −3.410E+01 | 35.358 | −52.992 | −5.797 | −11.059 |
| Conic Constant (K) | 0.000E+00 | 0.000E+00 | 0.000E+00 | 0.000E+00 | 0.000E+00 |
| 4th order Coefficient (A) | 2.044E−05 | 1.787E−05 | −3.593E−05 | 6.664E−05 | −7.452E−04 |
| 6th order Coefficient (B) | 4.748E−08 | −1.391E−07 | −1.206E−06 | −9.639E−06 | 2.816E−06 |
| 8th order Coefficient (C) | 2.215E−11 | −9.625E−10 | −9.999E−09 | −1.717E−08 | 1.058E−07 |
| 10th order Coefficient (D) | 9.408E−13 | −2.557E−11 | 2.512E−10 | 2.238E−08 | −1.390E−09 |
| 12th order Coefficient (E) | 5.889E−15 | −3.396E−13 | −1.627E−12 | 4.908E−26 | 7.792E−26 |
| 14th order Coefficient (F) | 7.391E−17 | −4.501E−15 | −7.333E−26 | 3.837E−30 | 7.731E−30 |
| 16th order Coefficient (G) | −3.359E−20 | 1.743E−29 | −7.524E−29 | 2.313E−34 | 3.147E−34 |
| 18th order Coefficient (H) | −1.388E−21 | 2.812E−32 | 5.708E−35 | 8.413E−39 | 1.747E−38 |
| 20th order Coefficient (J) | −1.280E−23 | 5.265E−33 | −6.033E−34 | 9.703E−40 | −4.375E−40 |

Figure 3:
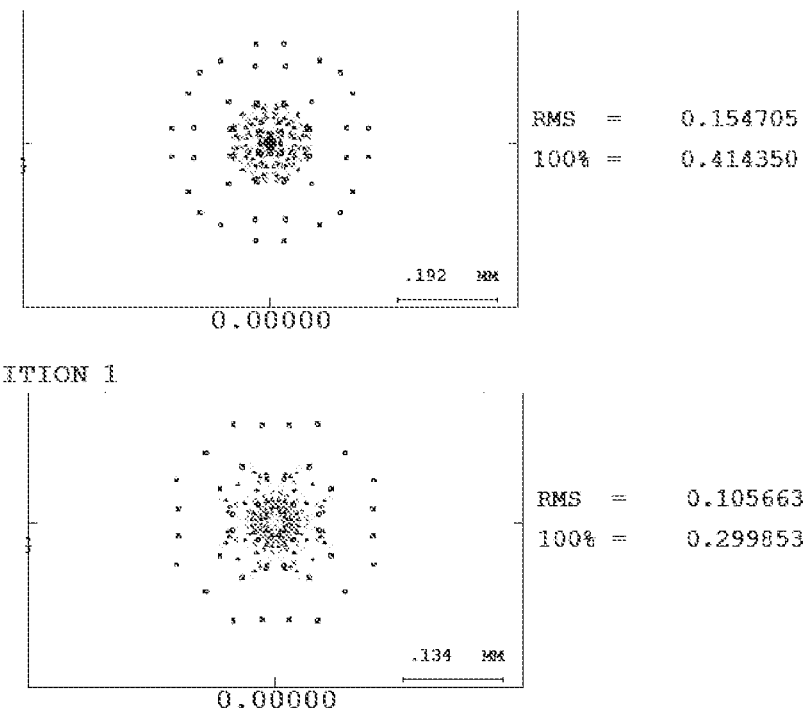
FIG. 3 is spot diagrams of two zoom positions of the zoom optical system according to the embodiment of the present invention.

FIG. 3 shows the spot diagrams of two zoom positions. It can be seen that in the whole zoom range, the root mean square diameter of the image points are about 100 microns to 150 microns, that is, the spot diameter on the front end surface of the optical fiber is basically equal to the diameter of the ordinary optical fiber. At the same time, the back working distance of the zoom optical system S is 18 mm, and the spot diameter on the lens S13 is 4.93 mm, which ensures that the on-axis image point divergence angle 2α is 30.6 degrees. So the coupling condition of the optical fiber is well matched, and the coupling efficiency of the space light coupling into the optical fiber is improved. And measurement sensitivity of the system is greatly improved.

Figure 4:
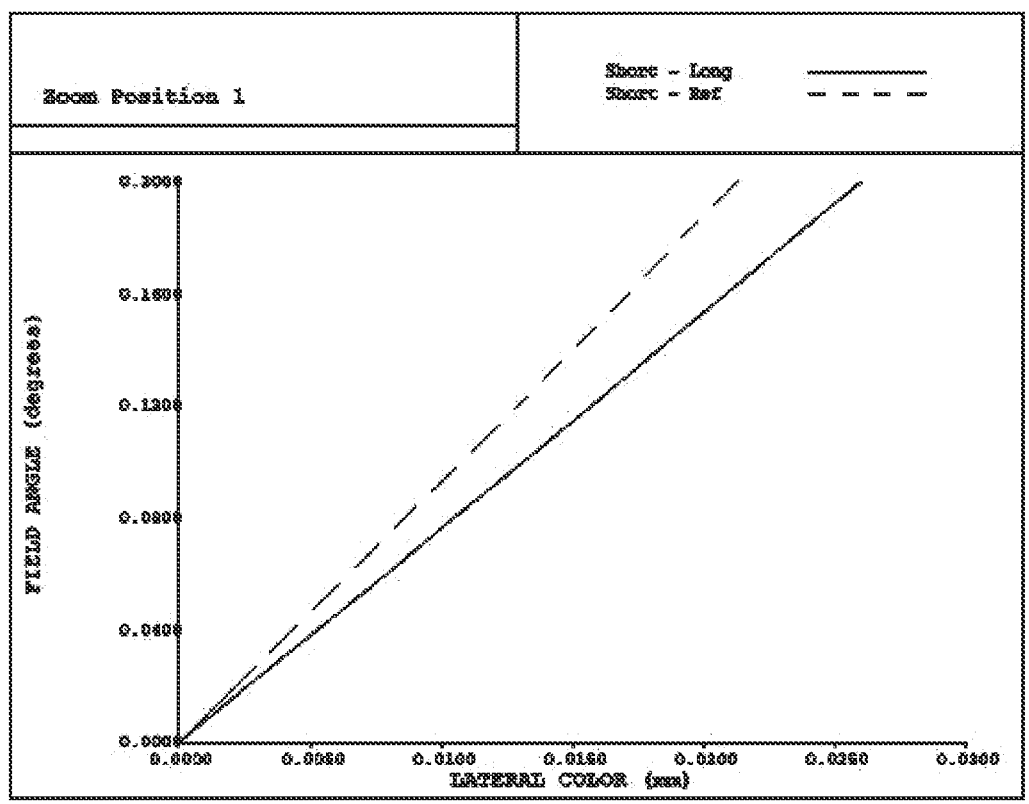
FIG. 4 is a vertical chromatic aberration diagram at zoom position 1 of the zoom optical system according to the embodiment of the present invention.
Figure 5:
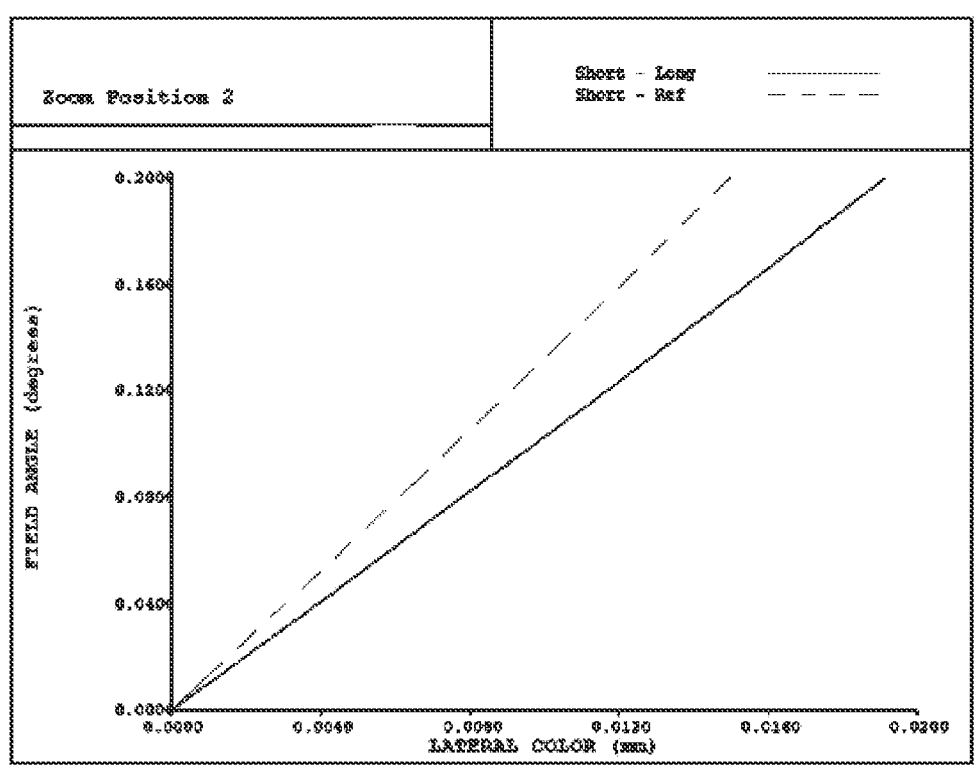
FIG. 5 is a vertical chromatic aberration diagram at zoom position 2 of the zoom optical system according to the embodiment of the present invention.
Figure 6:
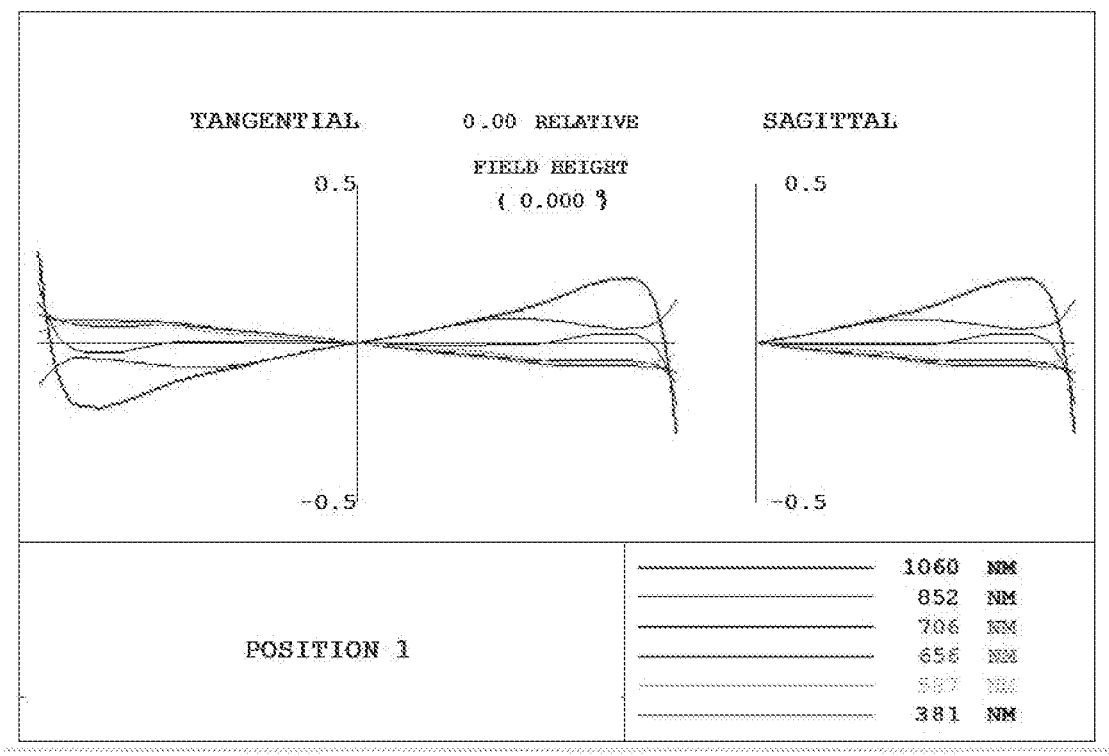
FIG. 6 is ray aberration curves at the zoom position 1 of the zoom optical system according to the embodiment of the present invention.
Figure 7:
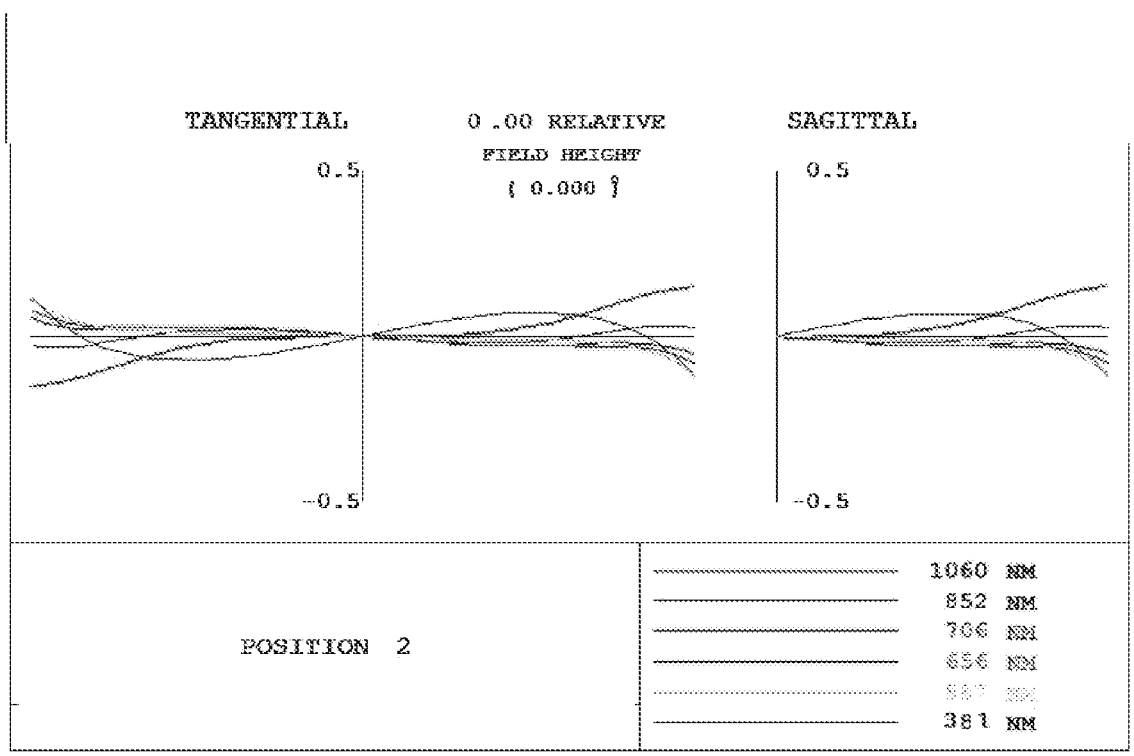
FIG. 7 is ray aberration curves at the zoom position 2 of the zoom optical system according to the embodiment of the present invention.
Figure 8:
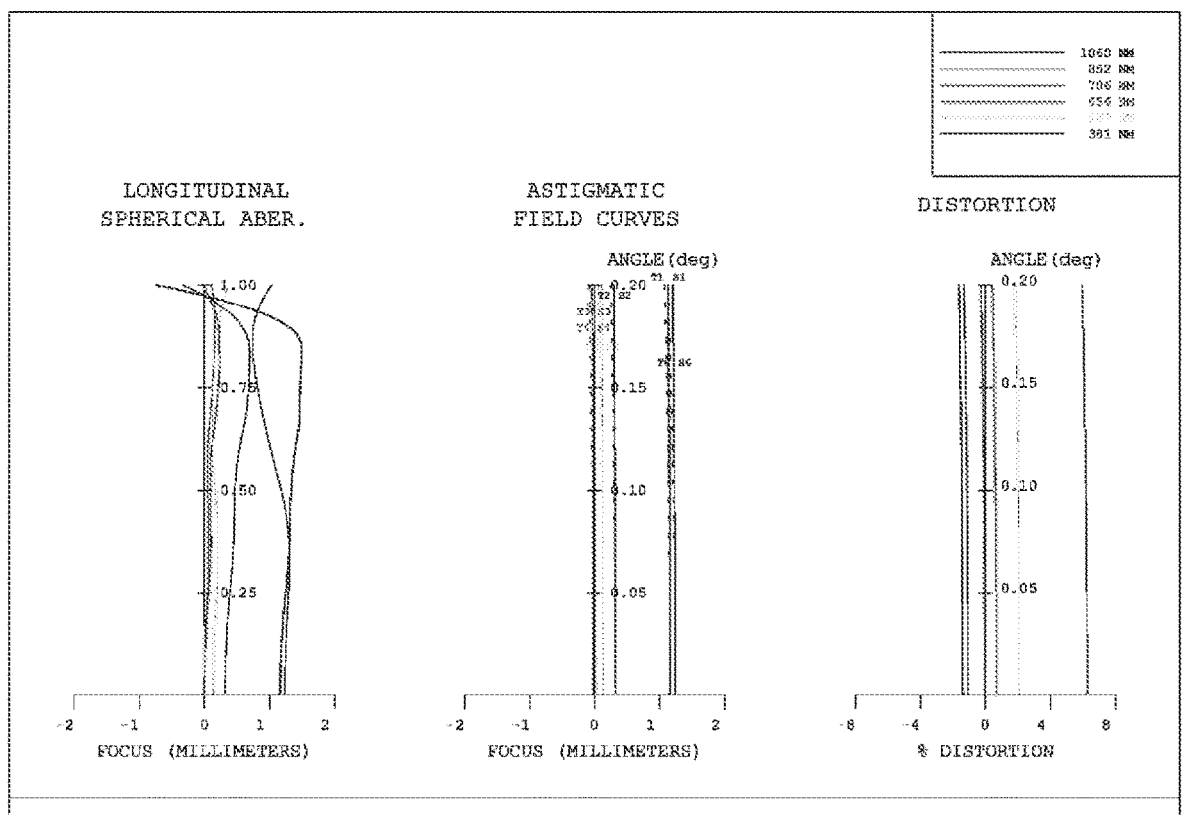
FIG. 8 is field curves at the zoom position 1 of the zoom optical system according to the embodiment of the present invention.
Figure 9:
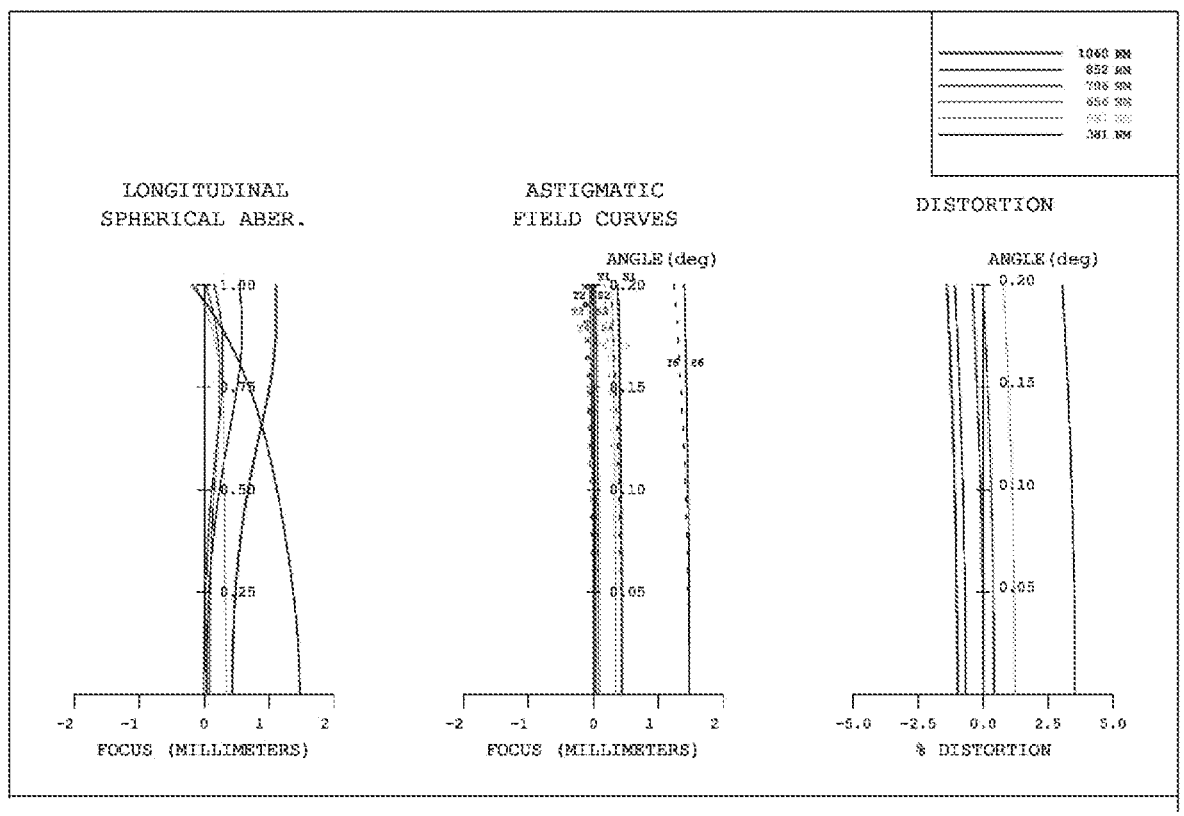
FIG. 9 is field curves at zoom position 2 of the zoom optical system according to the embodiment of the present invention.

FIG. 4 and FIG. 5 show the vertical chromatic aberration diagrams at the two zoom positions. It can be seen that the vertical chromatic aberration is less than 0.03 mm in the entire zoom range from 380 nm to 1060 nm, which solves the time delay problem of different wavelengths in wide spectra detection. The accuracy of the signal is ensured, and a solid foundation is provided for the measurement of the dynamic process and the transient process.

FIG. 6 to FIG. 9 shows the imaging performance of the zoom optical system S in this embodiment. The results show that the imaging effect is excellent, and the signal can be collected and detected accurately.

The non-linear optical absorption cross-section measurement method by using the non-linear optical pumping detection apparatus comprises the following steps:

S1. System Initialization

The initial values of the non-linear optical pumping detection apparatus are set according to the actual measurement requirements and the laser parameters, and the details are as follows:

① According to the actual measurement requirements, select an appropriate laser 1, and adjust the chopper 3 according to the laser's own parameters (such as output power, pulse frequency, etc.) to control the laser repetition frequency which incidence to the sample 17. Adjust the polarization direction of the second polarizer 5 to be vertical, adjust the first polarizer 4 to adjust the incident energy of the whole light path, and ensure that the sample 17, optical power meter 30 and optical multichannel analyzer 19 will not be damaged when the transmittance of the first adjustable attenuator 9 and the second adjustable attenuator 21 is 100%. Adjust the ninth reflector 28 and the fourth converging lens 29 to make the laser converge on the rear surface of the sample 17, and adjust the second adjustable attenuator 21 to make the laser energy slightly lower than the energy threshold of two-photon absorption in the sample 17. Adjust the first converging lens 10 to make the laser converge on the central position of the heavy water tank 11, and adjust the first adjustable attenuator 9 to make the heavy water tank 11 generate stable white light. Adjust the second converging lens 14 to enable the white light to be emitted in parallel. And adjust the third converging lens 16 to make the white light converge on the sample 17 and generate effective coincidence with the converging beam from the fourth converging lens 29. Adjust the high-performance linear translation platform A to synchronize the non-degenerate excitation light path and the non-degenerate detection light path. Adjust the fifth converging lens 33 to make the laser converge on the sample 17, and make sure the converging point is not coincident with the non-degenerate light path. Adjust the tenth reflector 41 to enable the reference light path to pass through the sample 17 and not to coincide with the degenerate light path and the non-degenerate light path. Respectively adjust the first optical signal collection system 18, the second optical signal collection system 34 and the third optical signal collection system 42 to make the signal received by the optical multichannel analyzer 19 strongest.

S2. Non-Linear Absorption Spectra Measurement

The non-linear absorption spectra are divided into non-degenerate absorption spectra and degenerate absorption spectra, and the measurement process is carried out simultaneously, as follows:

② Non-Linear Absorption Spectra Measurement

After the apparatus is started and the output of the laser 1 is stable, the laser passing through the third converging lens 16 and the laser passing through the fourth converging lens 29 are superposed in the sample 17 at a small angle of 10 degrees. Upon initialization of the apparatus, the first adjustable attenuator 9, the second adjustable attenuator 21, the first converging lens 10, the second converging lens 14, the third converging lens 16, the fourth converging lens 29, the fifth converging lens 33, the first optical signal collection system 18, the second optical signal collection system 34, the third optical signal collection system 42 and the high-performance linear translation platform A are all optimized by the computer 20 in a circulation way one by one. Until the signals received by the optical multichannel analyzer 19 from the first optical signal collection system 18, the second optical signal collection system 34, and the third optical signal collection system 42 are all the strongest. At this moment, the sampling integral time and the sampling times are set by the computer 20. The optical signals of the first optical signal collection system 18, the second optical signal collection system 34 and the third optical signal collection system 42 are simultaneously collected and stored by the optical multichannel analyzer 19. A non-degenerate transmission spectrum P1, a degenerate transmission spectrum P2 and a reference spectrum P3 of the sample 17 are obtained respectively. Then the sample 17 is taken out of the apparatus, and a reference sample 50 which is prepared in advance and only contains solution is put in. The optical signals of the first optical signal collection system 18, the second optical signal collection system 34 and the third optical signal collection system 42 are simultaneously collected and stored by the optical multichannel analyzer 19. And a non-degenerate transmission spectrum P4, a degenerate transmission spectrum P5 and a reference spectrum P6 of the reference sample 50 are obtained respectively.

S3. Monitoring Part

The influencing factors that may be encountered during the measurement shall be monitored, and the abnormalities shall be handled in time, as follows:

③ In the measurement process, the computer 20 repeatedly collects and stores the optical signals of the third optical signal collection system 42 through the optical multichannel analyzer 19 in real time. The working state of the apparatus is obtained by analyzing the data in real time. If there is a big difference between the two data obtained in the measurement process, the computer 20 will be automatically abandoned the measured data by this process S2. The computer 20 performs monitoring through the optical power meter 30 in real time. And if the power changing in the measurement process, it means the laser is unstable, and the computer 20 will be automatically abandoned the measured data by this process S2.

S4. Data Processing

According to the experimental data, the non-degenerate absorption spectrum and degenerate absorption spectrum of the sample 17 are obtained. The details are as follows:

④ Normalize the non-degenerate transmission spectrum P1 and the degenerate transmission spectrum P2 point by point with reference to the reference spectrum P3 respectively to obtain a normalized non-degenerate transmission spectrum P1' and a normalized degenerate transmission spectrum P2' respectively.

Normalize the non-degenerate transmission spectrum P4 and the degenerate transmission spectrum P5 point by point with reference to the reference spectrum P6 to obtain a normalized non-degenerate transmission spectrum P4' and a normalized degenerate transmission spectrum P5' respectively.

Subtract the normalized non-degenerate transmission spectrum P4' from the normalized non-degenerate transmission spectrum P1' to obtain the relative non-degenerate absorption spectrum X1 of the sample 17; Subtract the normalized degenerate transmission spectrum P5' from the normalized degenerate transmission spectrum P2' to obtain the relative degenerate absorption spectrum X2 of the sample 17;

The absolute absorption cross-section at the wavelength λ is calculated as follows:

The relationship between the normalized transmittance $Q'(\tau_d)$ of the probe light and the normalized delay time $\tau_d$ (the ratio of the delay time to the pulse width of the excitation light) is:

$$Q'(\tau_d, W, \rho, \gamma) = \frac{1}{W\pi^{1/2}} \int_{-\infty}^{+\infty} \exp\left\{-\left(\frac{\tau + \tau_d - \rho}{W}\right)^2 - \frac{\gamma \pi^{1/2}}{\rho}(\text{erf}(\tau) - \text{erf}(\tau - \rho))\right\} d\tau \tag{1}$$

Where $W = w_p/w_e$ is the ratio of the probe light pulse width to the excitation light pulse width, and $\text{erf}(\tau)$ as an error function is defined as:

$$\text{erf}(x) = \frac{2}{\sqrt{\pi}} \int_0^x e^{-y^2} dy = -\frac{1}{x\sqrt{\pi}} e^{-x^2} \tag{2}$$

ρ is the group velocity mismatch parameter between the excitation light and the probe light, which can be obtained from the dispersion relation:

$$\rho = \frac{L}{w_e c}\left\{\left[n_p - \lambda_p \frac{d}{d_\lambda}|_\lambda\right] - \left[n_e - \lambda_e \frac{d_n}{d_\lambda}|_e\right]\right\} \tag{3}$$

Where $d_n$ is the refractive index change, $d_\lambda$ is the wavelength change. λ represents the wavelength, n represents the refractive index, the subscript p represents excitation light, the subscript e represents detection light, and c represents the speed of light.

In this study, ρ is used as the fitting parameter because the solution dispersion relation is unknown. The relationship between another fitting parameter γ and the non-degenerate two-photon absorption coefficient $\beta_{ND}$ is expressed as:

$$\gamma = L(n_2/n_1) I_1^0 \beta_{ND} \tag{4}$$

Where L is the thickness of the sample 17, $n_1$ and $n_2$ are the linear refractive indices of the excitation light and the detection light (which are approximately considered to be equal here), and $I_1^0$ is the peak power density of the excitation light at the focal point, which is converted from the power obtained by the optical power meter 30.

The relation between the non-degenerate two-photon absorption cross-section $\delta_{ND}$ and the non-degenerate two-photon absorption coefficient $\beta_{ND}$ is:

$$\delta_{ND} = \frac{1000h\left(\frac{v_1 + v_2}{2}\right)\beta_{ND}}{N_A C} \quad (5)$$

Where h is Planck's constant, $v_1$ and $v_2$ are the photon frequencies of the excitation and detection light, $N_A$ is Avogadro's constant, and C is the sample concentration.

The fitting parameter $\gamma$ can be obtained by fitting the experimental data (the relationship between the normalized transmittance and the delay time) through formula (1), and the non-degenerate two-photon absorption coefficient $\beta_{ND}$ can be obtained from the $\gamma$ value through formula (4), and then the non-degenerate two-photon absorption cross-section $\delta_{ND}$ can be obtained from formula (5).

Amplifying the relative non-degenerate absorption spectrum X1 and the relative degenerate absorption spectrum X2 in the whole spectrum region according to the corresponding proportion ($\delta_{ND}$ divided by the absorption coefficient at wavelength $\lambda$) to obtain corresponding absolute non-degenerate two-photon absorption cross-section spectrum X3 and absolute degenerate two-photon absorption cross-section spectrum X4. And then the computer output this result.

Figure 10:
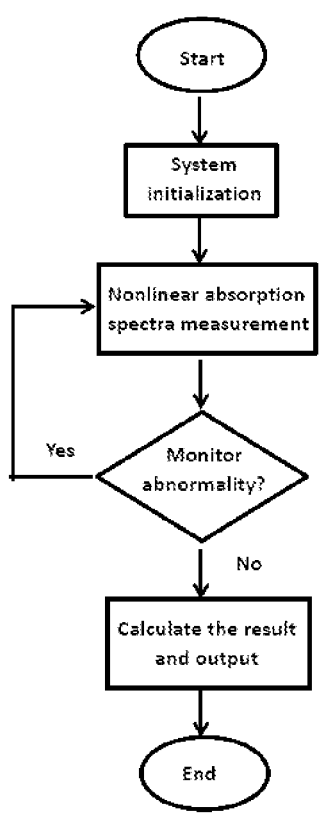
FIG. 10 is a schematic diagram of the steps of the measurement method of the present invention.

The above step S2, S3, S4 can be controlled by one-key in the software to realize the automation of the measurement process. The flow chart is shown in FIG. 10.

S5. Non-Linear Performance Dynamics Measurement Process

The apparatus can also measure the dynamical process of the degenerate and non-degenerate two-photon absorption spectra of the sample.

⑤ In the step S1, after adjusting the high-performance linear translation platform A to synchronize the non-degenerate pumping excitation light path and the non-degenerate detection light path, and this position is time 0. When the light path difference of the pumping excitation and the detection light is changed continuously (equal to the delay time difference), a series of two-photon absorption cross-sections can be obtained at different delay times. This provides sufficient data for the study of the dynamic process of materials.

The series of detailed descriptions listed above are only specific descriptions for the feasible embodiments of the invention. They are not used to limit the protection scope of the invention. All equivalent methods or changes not divorced from the technology of the invention shall be included in the protection scope of the invention.

What is claimed is:

1. A non-linear optical pumping detection apparatus, comprising a main light path, a non-degenerate detection system, a non-degenerate excitation system, a degenerate detection system, and a reference system, wherein
    the main light path sequentially comprises a laser, a first aperture diaphragm, a chopper, a first polarizer, a second polarizer, a first reflector, and a first laser beam splitter;
    the non-degenerate detection system sequentially comprises a second reflector, a first adjustable attenuator, a first converging lens, a heavy water tank, a second pinhole diaphragm, a neutral filter, a second converging lens, a second laser beam splitter, a third converging lens, a sample to be measured, and a first optical signal collection system; the first optical signal collection system is connected to an optical multichannel analyzer through a first optical fiber, and the optical multichannel analyzer is connected to a computer;
    the non-degenerate excitation system sequentially comprises a second adjustable attenuator, a third reflector, a fourth reflector, a fifth reflector, a sixth reflector, a seventh reflector, an eighth reflector, a ninth reflector, a fourth converging lens, the sample, and an optical power meter; the laser passing through the third converging lens and the laser passing through the fourth converging lens are superposed at an angle 5 to 15 degrees in the sample;
    the degenerate detection system sequentially comprises a third laser beam splitter, a triple prism, a fifth converging lens, the sample, and a second optical signal collection system; the second optical signal collection system is connected to the optical multichannel analyzer through a second optical fiber, and the optical multichannel analyzer is connected to the computer;
    the reference system sequentially comprises a tenth reflector, the sample, and a third optical signal collection system; the third optical signal collection system is connected to the optical multichannel analyzer through a third optical fiber, and the optical multichannel analyzer is connected to the computer.

2. The non-linear optical pumping detection apparatus according to claim 1, wherein
    the third reflector, the fourth reflector, the seventh reflector, and the eighth reflector are arranged on a high-performance linear translation platform;
    the first adjustable attenuator, the second adjustable attenuator, the first converging lens, the second converging lens, the third converging lens, the fourth converging lens, the fifth converging lens, the optical power meter, the first optical signal collection system, the second optical signal collection system, the third optical signal collection system, and the high-performance linear translation platform are separately connected with the computer through a control line;
    a diameter of the first pinhole diaphragm is 5 mm, and a diameter of the second pinhole diaphragm is 10 mm; a frequency of the chopper is configured to be adjusted from 4 Hz to 10 KHz; a polarization direction of the second polarizer is horizontal; the first reflector, the second reflector, the third reflector, the fourth reflector, the fifth reflector, the sixth reflector, the seventh reflector, and the eighth reflector are all 45° to a main optical axis; the first beam splitter, the second beam splitter, and the third beam splitter are all 45° to the main optical axis; a transmissivity of the first laser beam splitter is 10%, and a reflectivity of the first laser beam splitter is 90%; a transmissivity of the second laser beam splitter is 50%, and a reflectivity of the second laser beam splitter is 50%; a transmissivity of the third laser beam splitter is 10%, and a reflectivity of the third laser beam splitter is 90%; focal lengths of the first converging lens, the second converging lens, the third converging lens, and the fifth converging lens are all 10 cm, and a focal length of the fourth converging lens is 50 cm; a thickness of the sample is 10 mm; the first optical signal collection system, the second optical signal collection system, and the third optical signal collection system adopt a same zoom optical system.

3. The non-linear optical pumping detection apparatus according to claim 2, wherein
    the same zoom optical system comprises a first lens, a second lens, a third lens, a fourth lens, a fifth lens, a sixth lens, a seventh lens, an eighth lens, a ninth lens, a tenth lens, an eleventh lens, a twelfth lens, and a thirteenth lens.

4. The non-linear optical pumping detection apparatus according to claim 3, wherein
the first lens is an aperture stop;
the first lens, the third lens, the fourth lens, the sixth lens, the ninth lens, and the tenth lens, the twelfth lens, and the thirteenth lens are all positive lenses; the second lens, the fifth lens, the seventh lens, the eighth lens, and the eleventh lens are all negative lenses.

5. The non-linear optical pumping detection apparatus according to claim 3, wherein
the first lens is a meniscus concave lens, the second lens is a meniscus concave lens, the third lens is a biconvex lens, the fourth lens is a biconvex lens, the fifth lens is a biconvex lens, the sixth lens is a biconvex lens, the seventh lens is a biconvex lens, the eighth lens is a meniscus concave lens, the ninth lens is a biconvex lens, the tenth lens is a meniscus concave lens, the eleventh lens is a meniscus concave lens, the twelfth lens is a biconvex lens, the thirteenth lens is a meniscus concave lens;
the second lens and the third lens form a first cemented lens, and a cemented surface of a double cemented lens faces to an aperture stop; the fourth lens and the fifth lens form a second cemented lens, and the cemented surface of the double cemented lens backs to the aperture stop; the eighth lens and the ninth lens form a third cemented lens, and the cemented surface of the double cemented lens faces to the aperture stop; the tenth lens and the eleventh lens form a fourth cemented lens, and the cemented surface of the double cemented lens backs to the aperture stop;
the eleventh lens, the twelfth lens, and the thirteenth lens are aspheric lenses; the first lens, the second lens, the third lens, the fourth lens, the fifth lens, the sixth lens, the seventh lens, the eighth lens, the ninth lens, and the tenth lens are all spherical lenses.

6. The non-linear optical pumping detection apparatus according to claim 5, wherein
an air interval between the sample and the first lens is a variable ranging from 50 to 200 millimeters;
a center thickness of the first lens is 4.678±0.1 mm, and an air interval between the first lens and the first cemented lens is 1.0±0.1 mm; a center thickness of the first cemented lens is 19.891±0.1 mm, an air interval between the first cemented lens and the second cemented lens is 9.986±0.1 mm; a center thickness of the second cemented lens is 21.593±0.1 mm, and an air interval between the second cemented lens and the sixth lens is 1.438±0.1 mm; a center thickness of the sixth lens is 10.128±0.1 mm, and an air interval between the sixth lens and the seventh lens is variable, ranging from 4.563±0.1 to 69.469±0.1 mm; a center thickness of the seventh lens is 2.0±0.1 mm, and an air interval between the seventh lens and the third cemented lens is 1.0±0.1 mm; a center thickness of the third cemented lens is 6.629±0.1 mm, and an air interval between the third cemented lens and the fourth cemented lens is variable, ranging from 1.0±0.1 to 33.162±0.1 mm; a center thickness of the fourth cemented lens is 17.276±0.1 mm, and an air interval between the fourth cemented lens and the twelfth lens is a variable, ranging from 0.930±0.1 to 25.0±0.1 mm; a center thickness of the twelfth lens is 6.614±0.1 mm, and an air interval between the twelfth lens and the thirteenth lens is variable, ranging from 1.438±0.1 to 9.055±0.1 mm; a center thickness of the thirteenth lens is 5.356±0.1 mm, and an air interval between the thirteenth lens and a respective one of the first optical fiber, the second optical fiber, and the third optical fiber is 18.0±0.1 mm.

7. The non-linear optical pumping detection apparatus according to claim 3, wherein
a combined focal length of the first lens, the second lens, the third lens, the fourth lens, the fifth lens, and the sixth lens is f1-6, and a focal length of the seventh lens is f7; and $1.5<|f1-6/f7|<3$;
an aperture of the first lens is D1, and 45 mm<D1<55 mm.

8. The non-linear optical pumping detection apparatus according to claim 3, wherein
a lens material is a glass material from SCHOTT, the first lens is SF6, the second lens is SF5, the third lens is NLAF34, the fourth lens is NLASF9, the fifth lens is NSF56, the sixth lens is NLAK34, the seventh lens is SF57, and the eighth lens is SF2; the ninth lens is NLAF21, the tenth lens is NLAF21, the eleventh lens is SF2, the twelfth lens is PPK53, and the thirteenth lens is SF5G10.

9. The non-linear optical pumping detection apparatus according to claim 3, wherein
a working wavelength band of the same zoom optical system is 380 nm to near infrared 1064 nm.

10. The non-linear optical pumping detection apparatus according to claim 3, wherein
a back working distance of the same zoom optical system is 18.0 mm, and an axial image point divergence angle 2α is 30.6 degrees.

11. A non-linear optical absorption cross-section measurement method by using the non-linear optical pumping detection apparatus according to claim 1, comprising the following steps:
S1. system initialization: initial values of the non-linear optical pumping detection apparatus are set according to actual measurement requirements and laser parameters;
S2. non-linear absorption spectra measurement: non-linear absorption spectra are divided into non-degenerate absorption spectra and degenerate absorption spectra, and a measurement process is carried out simultaneously;
S3. monitoring part: influencing factors encountered during the measurement process are monitored, and abnormalities are handled in time; and
S4. data processing: according to experimental data, the non-degenerate absorption spectra and degenerate absorption spectra of the sample are obtained.

12. The non-linear optical absorption cross-section measurement method according to claim 11, wherein
details of S1 are as follows:
according to the actual measurement requirements, select the laser, and adjust the chopper according to parameters of the laser to control a laser repetition frequency incident to the sample; adjust a polarization direction of the second polarizer to be vertical, adjust the first polarizer to adjust an incident energy of a whole light path, and ensure that the sample, the optical power meter, and the optical multichannel analyzer will not be damaged when a transmittance of the first adjustable attenuator and the second adjustable attenuator is 100%; adjust the ninth reflector and the fourth converging lens to make a laser converge on a rear surface of the sample, and adjust the second adjustable attenuator to make the laser energy slightly lower than an energy threshold of two-photon absorption in the sample; adjust the first converging lens to make the laser converge on a central position of the heavy water tank, and adjust the first adjustable attenuator to make the heavy water tank generate a stable white light; adjust the second converging lens to enable the stable white light to be emitted in parallel; and adjust the third converging lens to make the stable white light converge on the sample and generate effective coincidence with a converging beam from the fourth converging lens; adjust a high-performance linear translation platform to synchronize a non-degenerate excitation light path and a non-degenerate detection light path; adjust the fifth converging lens to make the laser converge on the sample, and make sure a converging point is not coincident with the non-degenerate light path; adjust the tenth reflector to enable a reference light path to pass through the sample and not to coincide with a degenerate light path and the non-degenerate light path; respectively adjust the first optical signal collection system, the second optical signal collection system, and the third optical signal collection system to make a signal received by the optical multichannel analyzer strongest.

13. The non-linear optical absorption cross-section measurement method according to claim 12, wherein
the parameters of the laser include an output power and a pulse frequency.

14. The non-linear optical absorption cross-section measurement method according to claim 12, wherein
details of S2 are as follows:
the non-linear absorption spectra measurement
after the non-linear optical pumping detection apparatus is started and an output of the laser is stable, the laser passing through the third converging lens and the laser passing through the fourth converging lens are superposed in the sample at a small angle; upon an initialization of the non-linear optical pumping detection apparatus, the first adjustable attenuator, the second adjustable attenuator, the first converging lens, the second converging lens, the third converging lens, the fourth converging lens, the fifth converging lens, the first optical signal collection system, the second optical signal collection system, the third optical signal collection system, and a high-performance linear translation platform are all optimized by the computer in a circulation way one by one; until the signal received by the optical multichannel analyzer from the first optical signal collection system, the second optical signal collection system, and the third optical signal collection system are all the strongest; at this moment, a sampling integral time and a sampling times are set by the computer; optical signals of the first optical signal collection system, the second optical signal collection system, and the third optical signal collection system are simultaneously collected and stored by the optical multichannel analyzer; a first non-degenerate transmission spectrum, a first degenerate transmission spectrum, and a first reference spectrum of the sample are obtained respectively; then the sample is taken out of the non-linear optical pumping detection apparatus, and a reference sample prepared in advance and only containing solution is put in; the optical signals of the first optical signal collection system, the second optical signal collection system, and the third optical signal collection system are simultaneously collected and stored by the optical multichannel analyzer; and a second non-degenerate transmission spectrum, a second degenerate transmission spectrum, and a second reference spectrum of the reference sample are obtained respectively.

15. The non-linear optical absorption cross-section measurement method according to claim 14, wherein
the small angle is 5-15 degrees.

16. The non-linear optical absorption cross-section measurement method according to claim 14, wherein
details of S3 are as follows:
in the measurement process, the computer repeatedly collects and stores the optical signals of the third optical signal collection system through the optical multichannel analyzer in real time; a working state of the non-linear optical pumping detection apparatus is obtained by analyzing the data in real time; if there is a big difference between the two data obtained in the measurement process, the computer will automatically abandon the measured data by S2; the computer performs monitoring through the optical power meter in real time; and if a power changing in the measurement process, the laser is unstable, and the computer will automatically abandon the measured data by S2.

17. The non-linear optical absorption cross-section measurement method according to claim 16, characterized in that:
details of S4 are as follows:
normalize the first non-degenerate transmission spectrum and the first degenerate transmission spectrum point by point with reference to the first reference spectrum respectively to obtain a first normalized non-degenerate transmission spectrum and a first normalized degenerate transmission spectrum respectively;
normalize the second non-degenerate transmission spectrum and the second degenerate transmission spectrum point by point with reference to the second reference spectrum to obtain a second normalized non-degenerate transmission spectrum and a second normalized degenerate transmission spectrum respectively;
subtract the second normalized non-degenerate transmission spectrum from the first normalized non-degenerate transmission spectrum to obtain a relative non-degenerate absorption spectrum of the sample; subtract the second normalized degenerate transmission spectrum from the first normalized degenerate transmission spectrum to obtain a relative degenerate absorption spectrum of the sample;
an absolute absorption cross-section at a wavelength $\lambda$ is calculated as follows:
a relationship between a normalized transmittance $Q'(\tau_d)$ of a probe light and a normalized delay time $\tau_d$ (a ratio of a delay time to a pulse width of an excitation light) is:

$$Q'(\tau_d, W, \rho, \gamma) = \frac{1}{W\pi^{1/2}} \int_{-\infty}^{+\infty} \exp\left\{-\left(\frac{\tau + \tau_d - \rho}{W}\right)^2 - \frac{\gamma\pi^{1/2}}{\rho}(\text{erf}(\tau) - \text{erf}(\tau - \rho))\right\} d\tau \quad (1)$$

where $W = w_p/w_e$ is a ratio of a pulse width of the probe light to the pulse width of the excitation light, and $\text{erf}(\tau)$ as an error function is defined as:

$$\text{erf}(x) = \frac{2}{\sqrt{\pi}} \int_0^x e^{-y^2} dy = -\frac{1}{x\sqrt{\pi}} e^{-x^2} \quad (2)$$

ρ is a group velocity mismatch parameter between the excitation light and the probe light and obtained from a dispersion relation:

$$\rho = \frac{L}{w_e c} \left\{ \left[ n_p - \lambda_p \frac{d}{d_\lambda} |_\lambda \right] - \left[ n_e - \lambda_e \frac{d_n}{d_\lambda} |_e \right] \right\} \quad (3)$$

where $d_n$ is a refractive index change, $d_\lambda$ is a wavelength change; λ represents the wavelength, n represents a refractive index, the subscript p represents the excitation light, the subscript e represents a detection light, and c represents a speed of light;

in this study, ρ is used as a fitting parameter because a solution dispersion relation is unknown; a relationship between another fitting parameter γ and a non-degenerate two-photon absorption coefficient $\beta_{ND}$ is expressed as:

$$\gamma = L(n_2/n_1) I_1^0 \beta_{ND} \quad (4)$$

where L is a thickness of the sample, $n_1$ and $n_2$ are linear refractive indices of the excitation light and the detection light, $n_1$ is equal to $n_2$, and $I_1^0$ is a peak power density of the excitation light at a focal point and converted from a power obtained by the optical power meter;

a relation between a non-degenerate two-photon absorption cross-section $\delta_{ND}$ and the on-degenerate two-photon absorption coefficient $\beta_{ND}$ is:

$$\delta_{ND} = \frac{1000 h \left( \frac{v_1 + v_2}{2} \right) \beta_{ND}}{N_A C} \quad (5)$$

where h is a Planck's constant, $v_1$ and $v_2$ are photon frequencies of the excitation light and the detection light, $N_A$ is an Avogadro's constant, and C is a sample concentration;

the fitting parameter γ is configured to be obtained by fitting the experimental data (a relationship between the normalized transmittance and the delay time) through formula (1), and the non-degenerate two-photon absorption coefficient $\beta_{ND}$ is configured to be obtained from a value of the fitting parameter γ through formula (4), and then the non-degenerate two-photon absorption cross-section $\delta_{ND}$ is configured to be obtained from formula (5);

amplifying the relative non-degenerate absorption spectrum and the relative degenerate absorption spectrum in a whole spectrum region according to a corresponding proportion ($\delta_{ND}$ divided by an absorption coefficient at the wavelength λ) to obtain a corresponding absolute non-degenerate two-photon absorption cross-section spectrum and an absolute degenerate two-photon absorption cross-section spectrum; and then the computer output a result.

18. The non-linear optical absorption cross-section measurement method according to claim 17, wherein
the steps S2, S3, S4 are configured to be controlled by one-key in a software to realize an automation of the measurement process.

19. The non-linear optical absorption cross-section measurement method according to claim 11, wherein in the non-linear optical pumping detection apparatus,
the third reflector, the fourth reflector, the seventh reflector, and the eighth reflector are arranged on the high-performance linear translation platform;
the first adjustable attenuator, the second adjustable attenuator, the first converging lens, the second converging lens, the third converging lens, the fourth converging lens, the fifth converging lens, the optical power meter, the first optical signal collection system, the second optical signal collection system, the third optical signal collection system, and the high-performance linear translation platform are separately connected with the computer through a control line;
a diameter of the first pinhole diaphragm is 5 mm, and a diameter of the second pinhole diaphragm is 10 mm; a frequency of the chopper is configured to be adjusted from 4 Hz to 10 KHz; a polarization direction of the second polarizer is horizontal; the first reflector, the second reflector, the third reflector, the fourth reflector, the fifth reflector, the sixth reflector, the seventh reflector, and the eighth reflector are all 45° to a main optical axis; the first beam splitter, the second beam splitter, and the third beam splitter are all 45° to the main optical axis; a transmissivity of the first laser beam splitter is 10%, and a reflectivity of the first laser beam splitter is 90%; a transmissivity of the second laser beam splitter is 50%, and a reflectivity of the second laser beam splitter is 50%; a transmissivity of the third laser beam splitter is 10%, and a reflectivity of the third laser beam splitter is 90%; focal lengths of the first converging lens, the second converging lens, the third converging lens, and the fifth converging lens are all 10 cm, and a focal length of the fourth converging lens is 50 cm; a thickness of the sample is 10 mm; the first optical signal collection system, the second optical signal collection system, and the third optical signal collection system adopt a same zoom optical system.

20. The non-linear optical absorption cross-section measurement method according to claim 19, wherein in the non-linear optical pumping detection apparatus,
the same zoom optical system comprises a first lens, a second lens, a third lens, a fourth lens, a fifth lens, a sixth lens, a seventh lens, an eighth lens, a ninth lens, a tenth lens, an eleventh lens, a twelfth lens, and a thirteenth lens.

* * * * *